Figures 1, 2, 3:
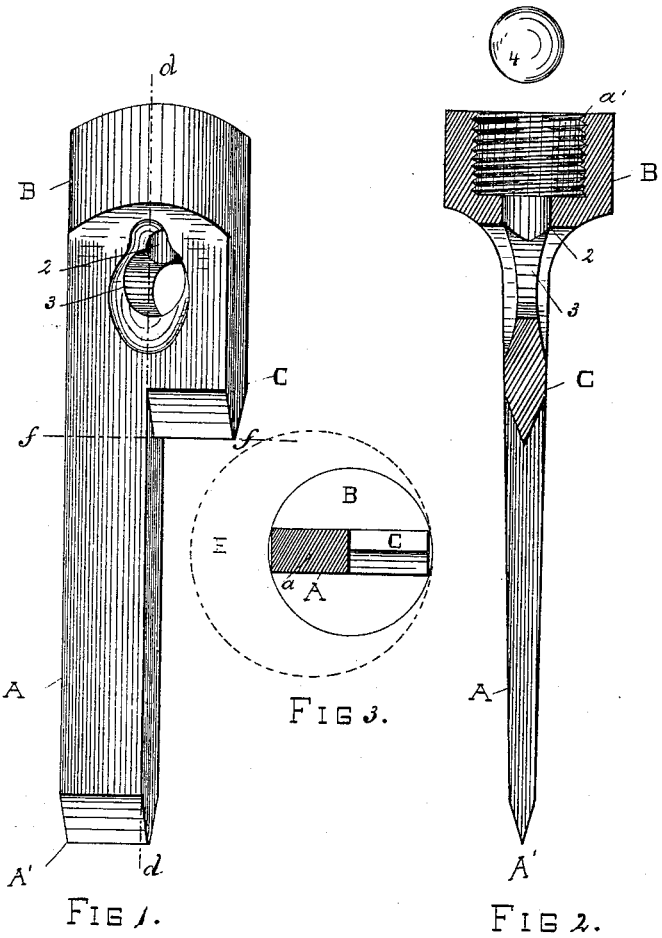

(No Model.)

R. G. MARCY.
ROCK DRILL.

No. 335,373. Patented Feb. 2, 1886.

WITNESSES:
Charles Weber
M. Vandevere

INVENTOR,
R. G. Marcy
BY J. C. Higdon
ATTORNEY.

UNITED STATES PATENT OFFICE.

RUFUS G. MARCY, OF KANSAS CITY, MISSOURI.

ROCK-DRILL.

SPECIFICATION forming part of Letters Patent No. 335,373, dated February 2, 1886.

Application filed November 16, 1885. Serial No. 182,935. (No model.)

*To all whom it may concern:*

Be it known that I, RUFUS G. MARCY, of Kansas City, Jackson county, Missouri, have invented a new and useful Improvement in Rock-Drills, of which the following is a full, clear, and exact description, reference being had to the accompanying drawings, forming a part hereof.

My invention consists in a device for drilling holes in rock, hard-pan, cement, gravel, or other hard substance, and where a hole is desired that is larger than the drill itself—as, for instance, when Artesian-well pipe has been put down one hundred feet or more before rock is struck that must be penetrated and a hole below is necessary to be made as large as the outside diameter of the pipe.

In the drawings, Figure 1 represents a side elevation of the improved drill. Fig. 2 is a vertical section through the same on line $d\ d$, Fig. 1; and Fig. 3 is a transverse section on line $f\ f$, same figure, and illustrating the size of the drill and the relative diameter of the hole formed by it in operation.

The letter B shows the main body of the drill, which we will suppose has a diameter of two inches. This main body is bored out and provided with an internal screw-thread, $a'$, at its upper end, by means of which it may be attached to drill or sand-pump rods. A cutting edge or bit, C, is formed upon the said main portion, and it has a width of, say, one inch, or one-half the full width of the main portion B.

A represents an extension of the remaining half of the main portion B, having a length of about five inches and extending below the first-mentioned cutter or cutting edge. The extreme end of this extension has a drill-point or cutting-edge, A′, ground or otherwise formed upon it. A hole, 3, having each of its sides flared outwardly, extends transversely through the main portion B of the drill, and another hole, 2, is drilled longitudinally through the upper part of the main portion and intercepts the transverse hole 3. A valve or a ball, 4, is adapted to rest upon the upper end of the hole 2, and it will not perceptibly retard the entrance of chips or drillings into the space above it; but when this ball closes down upon the upper end of the hole 2 the drillings will be retained in the hollow drill-rod to which the drill is attached, and a quantity of drillings will be thus removed from the hole being drilled at each stroke of the drill. Thus, through the operation of the drill, the hole is kept comparatively clean, and the cutting-bits may strike the bottom of the hole with full force. The extension A was designed to form a guide for cutter C after drilling its own hole, and by turning the drill in its vertical motion the said extension will make a hole corresponding to its diameter—or, say, one inch—and then it will form a guide for cutter C. Cutter C, if properly handled, will drill a space of one inch entirely around the diameter of the hole made by the bit A′ of the extension A. Thus a drill so constructed will make a hole one and a half times its own size.

In conclusion, I would say that my drill should be constructed of good steel adapted for the purposes specified.

Having now described the construction of the invention, I will proceed to its operation. The drill should be firmly screwed on the rod that is to handle it, and lowered to its work. Drilling should be commenced by raising and dropping carefully and turning the drill at each blow until a hole is nicely started. When the extension A gets its hole formed, it should be obvious that by turning the drill during its up-and-down motion a hole three times the diameter of the extension will be made.

With drills of ordinary construction having but a single cutting-edge it is impossible to drill a hole that has a larger diameter than the cutter itself; hence the importance of a drill that will pierce rock with a hole that is larger than itself, and by the ordinary up-and-down motion of the common drill.

The letter $a$, Fig. 3, represents the center of a circle, E, (shown by dotted line,) which the periphery of the cutting-bit C will describe in drilling a hole that is one and a half times larger than the main body of the drill.

Having thus described the construction and operation of my invention, what I claim is—

1. A drill having a cutting-bit, C, formed upon one side of its main body and occupying one-half the diameter of said body, and having another bit, A, formed integral with the first mentioned upon the opposite side of the main body and extending below it a sufficient distance to drill an independent hole and guide the stroke of the entire drill, substantially as set forth.

2. As a new article of manufacture, a drill having the upper portion of its main body provided with a screw-threaded socket, a transverse hole, 3, and a vertical aperture, 2, which intersects said transverse hole, and having a cutting-bit, C, formed upon one side of the body and occupying one-half the diameter thereof, and having another bit, A, formed integral with the first mentioned, but occupying the remaining half of the diameter of the main body and being located opposite the bit C, and extending below it a sufficient distance to drill an independent hole and to guide the stroke of the entire drill, substantially as set forth.

In testimony whereof I affix my signature in presence of two witnesses.

RUFUS G. MARCY.

Witnesses:
A. KETCHUM,
J. T. COCHRAN.